3,099,530
MANUFACTURE OF DEFLUORINATED
PHOSPHATES
John D. Nickerson, Lakeland, Fla., assignor to International Minerals & Chemical Corporation, a corporation of New York
No Drawing. Filed Dec. 8, 1959, Ser. No. 858,061
2 Claims. (Cl. 23—109)

The present invention generally relates to the manufacture of defluorinated phosphates. More particularly, it relates to the manufacture of defluorinated phosphates useful as animal feed or animal feed supplement, although the defluorinated phosphates may also be used as fertilizer or plant food.

Mineral phosphates of all the commercially exploited natural deposits in the United States and in most foreign countries occur in the form of apatite. Apatite is a phosphate of lime containing varying amounts of chlorine, fluorine, and hydroxyl. It is generally represented by the formula $Ca_5(F \cdot Cl \cdot OH)(PO_4)_3$. The phosphorus pentoxide content varies from 41 to 42%. The fluorine content may reach as high as 3.8% or higher, and is generally about 3.3%. Because of the serious detrimental effects caused by continued feeding of significant amounts of fluorine to animals, particularly cattle, it is generally necessary to reduce the fluorine content of phosphate rock and of phosphatic materials made from phosphate rock so that the phosphorus to fluorine weight ratio, $P/F$, is greater than 100/1 before it is suitable for use as an animal feed.

The availability of the phosphate is also an important factor when the phosphate is used as an animal feed. By availability as used herein is meant that the phosphate is in the ortho-phosphate form or an equivalent state such as is found in beta-tricalcium phosphate, in which state the phosphate can best be assimilated by an animal. For animal feed, the phosphate is preferably substantially 100% in the ortho form, as determined by solubility in 0.4% HCl. Moreover, chick feeding tests have shown that 80% or more of the phosphate should be soluble in neutral ammonium citrate.

Accordingly it is an object of the present invention to provide a process for manufacturing a phosphate product of low fluorine content.

It is another object of the present invention to provide an animal feed ingredient meeting the industry's requirement for a product having a $P/F$ weight ratio greater than 100.

A specific object of the present invention is to provide a process for manufacturing an animal feed ingredient from triple superphosphate and a silicone.

These and other objects and advantages of the present invention will become apparent as the description of the present invention progresses.

In accordance with the present invention, a phosphatic material containing fluorine is mixed with a silicone and the mixture is heated to drive off fluorine. In a preferred embodiment of the invention, triple superphosphate is mixed with a silicone and the mixture is heated in an atmosphere containing steam to drive off fluorine.

The instant process offers an economical and novel method of obtaining an improved animal feed supplement. The process in its preferred embodiment entails the intimate mixing of finely divided solid phosphatic material and a silicone. Other materials may, of course, be included in the mixture as, for example, phosphoric acid, sulfuric acid, lime, limestone, soda ash, etc.

The fluorine-containing solid phosphatic material which has a $P/F$ weight ratio less than 100/1 and more generally less than 10/1, is preferably in finely divided form, generally less than 1 mm. size. The fluorine-containing phosphatic material may be phosphate rock, superphosphate, triple superphosphate, or mixtures thereof. Acid treated phosphate rock materials, especially phosphatic material resulting from treating phosphate rock with sulfuric acid and/or phosphoric acid, such as superphosphate, triple superphosphate and mixtures thereof, are specifically preferred phosphatic materials since it has been determined that silicones are particularly effective in defluorinating such materials. These phosphatic materials generally contain at least 1.0% by weight of fluorine and the present invention is particularly directed to defluorinating such materials. The phosphatic material is best utilized when it is finely ground so that from about 40% to about 80% is capable of passing through a 100 mesh screen. Less finely divided material may, however, be used.

The silicone is used as a liquid or a solid or semi-solid in a relatively finely divided form and is preferably used as an emulsion. The presence of a silicone in the calcination step greatly increases the amount of fluorine driven off during the heat treatment, thereby producing a product of higher $P/F$ than would be obtained under the same heating conditions in the absence of the silicone.

The silicone is present in the mix in minor proportions to effect a substantial degree of defluorination of the phosphate rock. The amount of silicone used is dictated, inter alia, by the amount of defluorination to be effected. It is preferred that the silicone be present in an amount of at least 0.01% by weight of the phosphatic material introduced into the calciner. The amount of silicone will usually be within the range of from about 0.01% to about 15% and preferably within the range of from about 0.05% to about 3% by weight of the phosphatic material. Amounts in excess of that necessary to achieve the desired degree of defluorination are, of course, economically impractical.

The silicones for use in the present invention are the high molecular weight polymers containing silicon and organic groups in the molecule in which the siloxane unit, —Si—O—Si—, is the continuing framework. Silicone fluids such as the dimethyl silicone and the methyl phenyl silicone fluids may be used. The chemical formula for the dimethyl fluids is

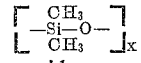

where X varies over a wide range. Silicone compounds which are grease-like in appearance and feel may also be used. These compounds are formulated from the dimethyl fluids by the addition of a few percent of finely divided silica. Silicone resins may also be used. These resins are usually formed by hydrolyzing and condensing or polymerizing mixtures of bifunctional and trifunctional alkylchlorosilanes. Silicone rubbers such as are prepared from a dimethyl silicone polymer, an inorganic filler, and a vulcanizer may be used. The silicone may be added directly, or it may be used as a solution or an emulsion. Silicones are widely available in commercial quantities from a large number of chemical manufacturers.

A mole ratio balancing salt selected from volatile anion salts of alkali metals may also be added to the phosphatic material before the heat treatment step. The addition of the volatile anion salt of an alkali metal is preferably in a proportion to give an alkali metal to $P_2O_5$ mole ratio between about 0.05:1 and about 0.6:1.

Any suitable volatile anion alkali metal salt may be added to the mix and specific salts are soda ash (sodium carbonate), sodium sulfate, sodium nitrate, sodium formate, sodium chloride, potassium carbonate, potassium sulfate, potassium nitrate, potassium formate, potassium chloride, and the like. Lithium, rubidium and cesium salts having volatile anions may also be used. Soda ash is particularly preferred because of its ready availability and low cost and because its use produces good results.

The phosphatic material, silicone and, when used, the mole ratio balancing salt, are intimately mixed in suitable mixing apparatus. After the ingredients are thoroughly mixed, they may directly be subjected to the heat treatment. When desired, however, the mixture may first be sprayed with water to form granules. It is preferable to add sufficient water so as to obtain a mixture having from about 5% to about 15% by weight of water. The water is preferably sprayed onto the mixture while it is being mixed in suitable granulating apparatus so as to form granules of the desired size. Ordinarily, this type of granulation process is carried out in apparatus which comprises a rotary drum in which the particles are agglomerated. When granulation is employed, the product from the granulating step is preferably sized and the particles in the desired size range are recovered while oversize and undersize particles are recycled to the granulator. For most animal feeds, the desired range of particle size is from 6 mesh to 35 mesh (—6 +35 mesh), Tyler series.

The mixture of phosphatic material, a silicone, and, when employed, a mole ratio balancing salt, with or without granulation, is next subjected to a heat treatment to drive off the fluorine. The mixture may be heated in any suitable equipment such as a rotary kiln in which the mixture is subjected to a tumbling action and in which the solids and gases can pass concurrently, but preferably pass in countercurrent flow. A fluid bed system may also be used. The heat treatment may be of the direct heating type wherein the flame and hot gases of combustion are directed into the product discharge end of the kiln; however, from the view of obtaining a high citrate solubility with a $P/F$ greater than 100, the temperature is preferably more closely controlled than a rotary kiln with an open flame may permit and, accordingly, it is preferred that the heat treatment equipment be of the indirect heating type.

The gaseous atmosphere which is in contact with the mixture of phosphatic material and the silicone preferably contains steam which aids materially in the defluorination. The presence of water vapor during the heat treatment has also been found to be important to the citrate solubility of the product. It is preferred that at least 5 mole percent of water vapor be present in the heating gases. Substantially 100% or pure steam may also be used; the preferred range, therefore, being from about 5% to about 100%. Such an atmosphere may be created by injection of steam or water into the calciner or by the use of fuel of sufficient hydrogen content so as to produce the desired water vapor content in the combustion products. Defluorination during the heat treatment is also enhanced by the sweeping action of gases passing over and through the comminuted solids.

The heat treatment temperature is generally below the normal temperatures contemplated during calcination in the phosphate industry. The temperature is preferably above 200° F. and below the fusion point of the material being calcined. The temperature is more preferably above 350° F. and a specifically preferred range is from about 350° F. to about 650° F. When treating triple superphosphate a preferred temperature range is from about 400° F. to about 450° F. No substantial amount of fusion should be permitted to occur during the calcining operation and accordingly the material is preferably heated below the fusion point. During the heat treatment, fluorine is driven off from the phosphatic material so as to render it acceptable as an animal feed ingredient.

In general, the temperature of the heating operation and the period of time the phosphatic material is at the temperature are dependent variables with longer periods of time being required at lower temperatures to achieve the same $P/F$. Or, conversely, at higher temperatures shorter periods of time are required to achieve the same $P/F$. The time period is usually more than 5 minutes and less than 4 hours; however, shorter or longer periods of time may be used. A period of time longer than necessary to achieve the desired $P/F$ is, however, generally economically impractical.

The citrate solubility of the product prepared in accordance with this invention is high. The high $P/F$ ratio and the high citrate solubility make the product eminently suitable for use as an animal feed ingredient; the product may, however, also be used as plant food.

The process of the invention will be more fully understood from the following example which is given by way of illustration only and without any intention of the invention being limited thereto.

EXAMPLE

A sample of triple superphosphate dried at 262° F. was divided into several portions. One portion was mixed with Dow Corning 20 Silicone Emulsion, a high molecular weight polymer containing silicon and organic groups in the molecule in which the silicone unit is the continuing framework. The amount of the emulsion used was 10% by weight of the triple superphosphate. Another portion was mixed with the same silicone emulsion in the amount of 1% by weight of the triple superphosphate. Each mixture was permitted to stand overnight at room temperature. Each mixture was then placed in a vertical tube furnace and subjected to a steam atmosphere at the temperatures indicated in the following table. The other portions of the triple superphosphate, without the addition of a silicone, were similarly treated at the conditions set forth in the table. After a two hour retention time in the furnace, each portion was cooled to 257° F. under steam and dried at 149° F. The following results were obtained:

*Table*

| Additive, Percent by Wt. | Temp. of Defluorination ±18° F. | Percent P | Percent of Total $P_2O_5$ | | $P/F$ |
|---|---|---|---|---|---|
| | | | Citrate Soluble | Ortho Phosphate | |
| 10% Silicone | 527 | 24.4 | 87.8 | 44.9 | 421 |
| 1% Silicone | 419 | 22.8 | 98.5 | 92.2 | 138 |
| No Additive (Steam Only) | 419 | 22.5 | | | 53 |
| Air (No Steam) | 392 | 23.5 | 97.5 | | 9 |
| Air (No Steam) | 572 | 25.3 | 80.0 | | 21 |

The table shows that when a silicone is present during the heating step, a defluorinated product having high citrate solubility and high ortho phosphate content is obtained.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A process for the manufacture of defluorinated phosphates which comprises mixing a phosphatic material containing fluorine in an amount which renders it unsuitable for use as an animal feed selected from the group consisting of phosphate rock, superphosphate, triple superphosphate and mixtures thereof, with a silicone containing silicon and an organic group in the molecule in which the siloxane unit, Si—O—Si—, is the continuing framework, said silicone selected from the group consisting of dimethyl silicone, methyl phenyl silicone, methylchlorosilane and mixtures thereof, said silicone used in an amount of at least 0.01% by weight of the phosphatic material, heating the mixture to a temperature above 200° F. and below the fusion point of the phosphatic material to drive off fluorine and recovering a phosphatic material of reduced fluorine content suitable for use as an animal feed.

2. The process according to claim 1 wherein said phosphatic material containing fluorine comprises triple superphosphate containing at least 1.0% by weight of fluorine and said silicone is dimethyl silicone.

References Cited in the file of this patent

UNITED STATES PATENTS

| | | |
|---|---|---|
| 2,044,774 | Curtis | June 23, 1936 |
| 2,220,575 | Luscher | Nov. 5, 1940 |
| 2,446,978 | Maust | Aug. 10, 1948 |
| 2,565,351 | Butt | Aug. 21, 1951 |
| 2,739,952 | Linville | Mar. 27, 1956 |